(12) United States Patent
Ali et al.

(10) Patent No.: US 11,343,866 B2
(45) Date of Patent: May 24, 2022

(54) METHOD, APPARATUS AND COMPUTER PROGRAM RELATED TO SECONDARY CELL GROUP REACTIVATION IN MULTI-RADIO ACCESS TECHNOLOGY-DUAL CONNECTIVITY

(71) Applicant: Nokia Technologies Oy, Espoo (FI)

(72) Inventors: Amaanat Ali, Espoo (FI); Jarkko Tuomo Koskela, Oulu (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 111 days.

(21) Appl. No.: 16/648,181

(22) PCT Filed: Sep. 20, 2017

(86) PCT No.: PCT/EP2017/073716
§ 371 (c)(1),
(2) Date: Mar. 17, 2020

(87) PCT Pub. No.: WO2019/057269
PCT Pub. Date: Mar. 28, 2019

(65) Prior Publication Data
US 2020/0245390 A1    Jul. 30, 2020

(51) Int. Cl.
*H04W 76/15* (2018.01)
*H04W 76/19* (2018.01)
(Continued)

(52) U.S. Cl.
CPC ....... *H04W 76/15* (2018.02); *H04W 36/0069* (2018.08); *H04W 36/14* (2013.01);
(Continued)

(58) Field of Classification Search
CPC ..... H04W 76/15; H04W 76/19; H04W 76/34; H04W 36/0069; H04W 36/14;
(Continued)

(56) References Cited

U.S. PATENT DOCUMENTS

| 2015/0117183 A1* | 4/2015 | Heo | H04W 76/10 370/228 |
|---|---|---|---|
| 2015/0215827 A1* | 7/2015 | Zhang | H04W 76/34 370/331 |

(Continued)

OTHER PUBLICATIONS

"5G Architecture Options—Full Set", Joint RAN/SA meeting, RP-161266, Deutsche Telekom AG, Jun. 14, 2016, 9 pages.

(Continued)

*Primary Examiner* — Will W Lin
(74) *Attorney, Agent, or Firm* — Brake Hughes Bellermann LLP (57) ABSTRACT

There is provided a method comprising, at a user equipment operating in connection with a first radio access technology network and a second radio access technology network, determining that communication using the second radio access technology is to be suspended and in response to the determining, suspending communication using the second radio access technology and storing a configuration relating to the second radio access technology such that communication using the second radio access technology can be reactivated via at least one of the first radio access technology network and the second radio access technology network.

17 Claims, 7 Drawing Sheets

(51) Int. Cl.
*H04W 76/34* (2018.01)
*H04W 36/00* (2009.01)
*H04W 36/14* (2009.01)
*H04W 74/08* (2009.01)
*H04W 88/06* (2009.01)
*H04W 88/10* (2009.01)

(52) U.S. Cl.
CPC ....... *H04W 74/0833* (2013.01); *H04W 76/19* (2018.02); *H04W 76/34* (2018.02); *H04W 88/06* (2013.01); *H04W 88/10* (2013.01)

(58) Field of Classification Search
CPC . H04W 74/0833; H04W 88/06; H04W 88/10; H04W 84/045
See application file for complete search history.

(56) References Cited

U.S. PATENT DOCUMENTS

| | | | | |
|---|---|---|---|---|
| 2016/0057800 A1* | 2/2016 | Ingale | ................... | H04L 5/0032 370/216 |
| 2016/0057802 A1* | 2/2016 | Lee | ................... | H04W 76/19 370/329 |
| 2016/0182276 A1* | 6/2016 | Wu | ................... | H04W 76/19 370/225 |
| 2016/0302256 A1* | 10/2016 | Susitaival | ................... | H04W 76/27 |
| 2017/0070902 A1* | 3/2017 | Fukuta | ................... | H04W 24/10 |
| 2017/0181216 A1 | 6/2017 | Worrall et al. | | |
| 2018/0213450 A1* | 7/2018 | Futaki | ................... | H04W 36/08 |
| 2019/0045404 A1* | 2/2019 | Tsai | ................... | H04W 36/0022 |
| 2019/0059039 A1* | 2/2019 | Centonza | ................... | H04W 76/19 |
| 2020/0112999 A1* | 4/2020 | Lee | ................... | H04W 74/0833 |
| 2020/0213882 A1* | 7/2020 | Hwang | ................... | H04W 76/34 |

OTHER PUBLICATIONS

"Mobility between LTE and NR for inactive UEs", J3GPP TSG-RAN WG2 #96, R2-168301, Ericsson, Nov. 14-18, 2016, pp. 1-4.
"3rd Generation Partnership Project; Technical Specification Group Radio Access Network; Study on Scenarios and Requirements for Next Generation Access Technologies; (Release 14)", 3GPP TR 38.913, V14.2.0, Mar. 2017, pp. 1-38.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 1-721.
"3rd Generation Partnership Project; Technical Specification Group Radio Access Network; NG Radio Access Network (NG-RAN); Xn application protocol (XnAP) (Release 15)", 3GPP TS 38.423, V0.1.1, Jun. 2017, 54 pages.
"3rd Generation Partnership Project; Technical Specification Group Radio Access Network; Evolved Universal Terrestrial Radio Access Network (E-UTRAN); X2 application protocol (X2AP) (Release 14)", 3GPP TS 36.423, V14.3.0, Jun. 2017, pp. 1-242.
International Search Report and Written Opinion received for corresponding Patent Cooperation Treaty Application No. PCT/EP2017/073716, dated May 28, 2018, 14 pages.
"RRC INACTIVE with MR DC", 3GPP TSG-RAN WG3 Meeting #97, R3-172739, Agenda Item: 10.6, Qualcomm Incorporated. Aug. 21-25, 2017, 6 pages.
"RRC Suspend/Resume in MR-DC", 3GPP TSG-RAN WG2 Meeting #99, R2-1708024, Agenda Item: 10.2.5, Ericsson, Aug. 21-25, 2017, pp. 1-4.

* cited by examiner

METHOD, APPARATUS AND COMPUTER PROGRAM RELATED TO SECONDARY CELL GROUP REACTIVATION IN MULTI-RADIO ACCESS TECHNOLOGY-DUAL CONNECTIVITY

RELATED APPLICATION

This application claims priority to PCT Application No. PCT/EP2017/073716, filed on Sep. 20, 2017, which is incorporated herein by reference in its entirety.

FIELD

The present application relates to a method, apparatus, system and computer program and in particular but not exclusively to secondary cell group (SCG) reactivation in multi radio access technology-dual connectivity (MR-DC).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. Standardization of 5G or New Radio networks is currently under discussion. LTE is being standardized by the 3rd Generation Partnership Project (3GPP).

SUMMARY

In a first aspect there is provided a method comprising, at a user equipment operating in connection with a first radio access technology network and a second radio access technology network, determining that communication using the second radio access technology is to be suspended and in response to the determining, suspending communication using the second radio access technology and storing a configuration relating to the second radio access technology such that communication using the second radio access technology can be reactivated via at least one of the first radio access technology network and the second radio access technology network.

Determining may comprise receiving an indication from the first radio access technology network or the second radio access technology network to suspend communication using the second radio access technology and store a configuration relating to the second radio access technology.

The determining may be based on at least one event.

The method may comprise changing the configuration relating to the second radio access technology based on at least one event.

The method may comprise receiving information from the first radio access technology network or the second radio access technology network, said information comprising an indication to change how the configuration relating to the second radio access technology changes based on the at least one event.

The method may comprise reactivating communication using the second radio access technology based on detecting at least one event.

The method may comprise receiving an indication from at least one of the first radio access technology network and the second radio access technology network to reactivate communication using the second radio access technology and reactivating communication using the second radio access technology in response to the received indication.

Reactivating communication using the second radio access technology may comprise performing a random access procedure with an access point of the second network.

The user equipment may be operating using dual connectivity.

The first access technology network may comprise master cell groups. The second access technology network may comprise secondary cell groups.

In a second aspect there is provided a method comprising, at a node of a first radio access technology network or a second radio access technology network, determining that communication using the second radio access technology at a user equipment operating in connection with the first radio access technology network and the second radio access technology network is to be suspended and in response to the determining, providing an indication to the user equipment to suspend communication using the second radio access technology and store a configuration relating to the second radio access technology such that communication using the second radio access technology can be reactivated via at least one of the first radio access technology network and the second radio access technology network.

The method may comprise comprising providing information to the user equipment, said information comprising an indication to change how the configuration relating to the second radio access technology changes based on at least one event.

The method may comprise providing an indication to the user equipment to reactivate communication using the second radio access technology.

The user equipment may be operating using dual connectivity.

The first radio access technology network may comprise master cell group. The second radio access technology network may comprise secondary cell groups.

In a third aspect there is provided an apparatus, said apparatus comprising, at a user equipment operating in connection with a first radio access technology network and a second radio access technology network, means for determining that communication using the second radio access technology is to be suspended and means for, in response to the determining, suspending communication using the second radio access technology and storing a configuration relating to the second radio access technology such that communication using the second radio access technology can be reactivated via at least one of the first radio access technology network and the second radio access technology network.

Means for determining may comprise means for receiving an indication from the first radio access technology network or the second radio access technology network to suspend communication using the second radio access technology and store a configuration relating to the second radio access technology.

The determining may be based on at least one event.

The apparatus may comprise means for changing the configuration relating to the second radio access technology based on at least one event.

The apparatus may comprise means for receiving information from the first radio access technology network or the second radio access technology network, said information comprising an indication to change how the configuration relating to the second radio access technology changes based on the at least one event.

The apparatus may comprise means for reactivating communication using the second radio access technology based on detecting at least one event.

The apparatus may comprise means for receiving an indication from at least one of the first radio access technology network and the second radio access technology network to reactivate communication using the second radio access technology and means for reactivating communication using the second radio access technology in response to the received indication.

Means for reactivating communication using the second radio access technology may comprise means for performing a random access procedure with an access point of the second network.

The user equipment may be operating using dual connectivity.

The first access technology network may comprise master cell groups. The second access technology network may comprise secondary cell groups.

In a fourth aspect there is provided an apparatus comprising means for, at a node of a first radio access technology network or a second radio access technology network, determining that communication using the second radio access technology at a user equipment operating in connection with the first radio access technology network and the second radio access technology network is to be suspended and means for, in response to the determining, providing an indication to the user equipment to suspend communication using the second radio access technology and store a configuration relating to the second radio access technology such that communication using the second radio access technology can be reactivated via at least one of the first radio access technology network and the second radio access technology network.

The apparatus may comprise comprising means for providing information to the user equipment, said information comprising an indication to change how the configuration relating to the second radio access technology changes based on at least one event.

The apparatus may comprise means for providing an indication to the user equipment to reactivate communication using the second radio access technology.

The user equipment may be operating using dual connectivity.

The first radio access technology network may comprise master cell group. The second radio access technology network may comprise secondary cell groups.

In a fifth aspect, there is provided an apparatus comprising at least one processor and at least one memory including a computer program code, the at least one memory and the computer program code configured to, with the at least one processor, cause the apparatus at least to, at a user equipment operating in connection with a first radio access technology network and a second radio access technology network, determine that communication using the second radio access technology is to be suspended and in response to the determining, suspend communication using the second radio access technology and store a configuration relating to the second radio access technology such that communication using the second radio access technology can be reactivated via at least one of the first radio access technology network and the second radio access technology network.

The apparatus may be configured to receive an indication from the first radio access technology network or the second radio access technology network to suspend communication using the second radio access technology and store a configuration relating to the second radio access technology.

The apparatus may be configured to determine that communication using the second RAT should be suspended may be based on at least one event.

The apparatus may be configured to change the configuration relating to the second radio access technology based on at least one event.

The apparatus may be configured to receive information from the first radio access technology network or the second radio access technology network, said information comprising an indication to change how the configuration relating to the second radio access technology changes based on the at least one event.

The apparatus may be configured to reactivate communication using the second radio access technology based on detecting at least one event.

The apparatus may be configured to receive an indication from at least one of the first radio access technology network and the second radio access technology network to reactivate communication using the second radio access technology and reactivate communication using the second radio access technology in response to the received indication.

The apparatus may be configured to perform a random access procedure with an access point of the second network.

The user equipment may be operating using dual connectivity.

The first access technology network may comprise master cell groups. The second access technology network may comprise secondary cell groups.

In a sixth aspect there is provided an apparatus comprising at least one processor and at least one memory including a computer program code, the at least one memory and the computer program code configured to, with the at least one processor, cause the apparatus at least to, at a node of a first radio access technology network or a second radio access technology network, determine that communication using the second radio access technology at a user equipment operating in connection with the first radio access technology network and the second radio access technology network is to be suspended and, in response to the determining, provide an indication to the user equipment to suspend communication using the second radio access technology and store a configuration relating to the second radio access technology such that communication using the second radio access technology can be reactivated via at least one of the first radio access technology network and the second radio access technology network.

The apparatus may be configured to provide information to the user equipment, said information comprising an indication to change how the configuration relating to the second radio access technology changes based on at least one event.

The apparatus may be configured to provide an indication to the user equipment to reactivate communication using the second radio access technology.

The user equipment may be operating using dual connectivity.

The first radio access technology network may comprise master cell group. The second radio access technology network may comprise secondary cell groups.

In a seventh aspect there is provided a computer program embodied on a non-transitory computer-readable storage medium, the computer program comprising program code for controlling a process to execute a process, the process comprising, at a user equipment operating in connection with a first radio access technology network and a second radio access technology network, determining that communication using the second radio access technology is to be suspended and in response to the determining, suspending communication using the second radio access technology and storing a configuration relating to the second radio access technology such that communication using the second radio access technology can be reactivated via at least one of the first radio access technology network and the second radio access technology network.

Determining may comprise receiving an indication from the first radio access technology network or the second radio access technology network to suspend communication using the second radio access technology and store a configuration relating to the second radio access technology.

The determining may be based on at least one event.

The process may comprise changing the configuration relating to the second radio access technology based on at least one event.

The process may comprise receiving information from the first radio access technology network or the second radio access technology network, said information comprising an indication to change how the configuration relating to the second radio access technology changes based on the at least one event.

The process may comprise reactivating communication using the second radio access technology based on detecting at least one event.

The process may comprise receiving an indication from at least one of the first radio access technology network and the second radio access technology network to reactivate communication using the second radio access technology and reactivating communication using the second radio access technology in response to the received indication.

Reactivating communication using the second radio access technology may comprise performing a random access procedure with an access point of the second network.

The user equipment may be operating using dual connectivity.

The first access technology network may comprise master cell groups. The second access technology network may comprise secondary cell groups.

In an eighth aspect there is provided a computer program embodied on a non-transitory computer-readable storage medium, the computer program comprising program code for controlling a process to execute a process, the process comprising, at a node of a first radio access technology network or a second radio access technology network, determining that communication using the second radio access technology at a user equipment operating in connection with the first radio access technology network and the second radio access technology network is to be suspended and in response to the determining, providing an indication to the user equipment to suspend communication using the second radio access technology and store a configuration relating to the second radio access technology such that communication using the second radio access technology can be reactivated via at least one of the first radio access technology network and the second radio access technology network.

The process may comprise comprising providing information to the user equipment, said information comprising an indication to change how the configuration relating to the second radio access technology changes based on at least one event.

The process may comprise providing an indication to the user equipment to reactivate communication using the second radio access technology.

The user equipment may be operating using dual connectivity.

The first radio access technology network may comprise master cell group. The second radio access technology network may comprise secondary cell groups.

In a ninth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
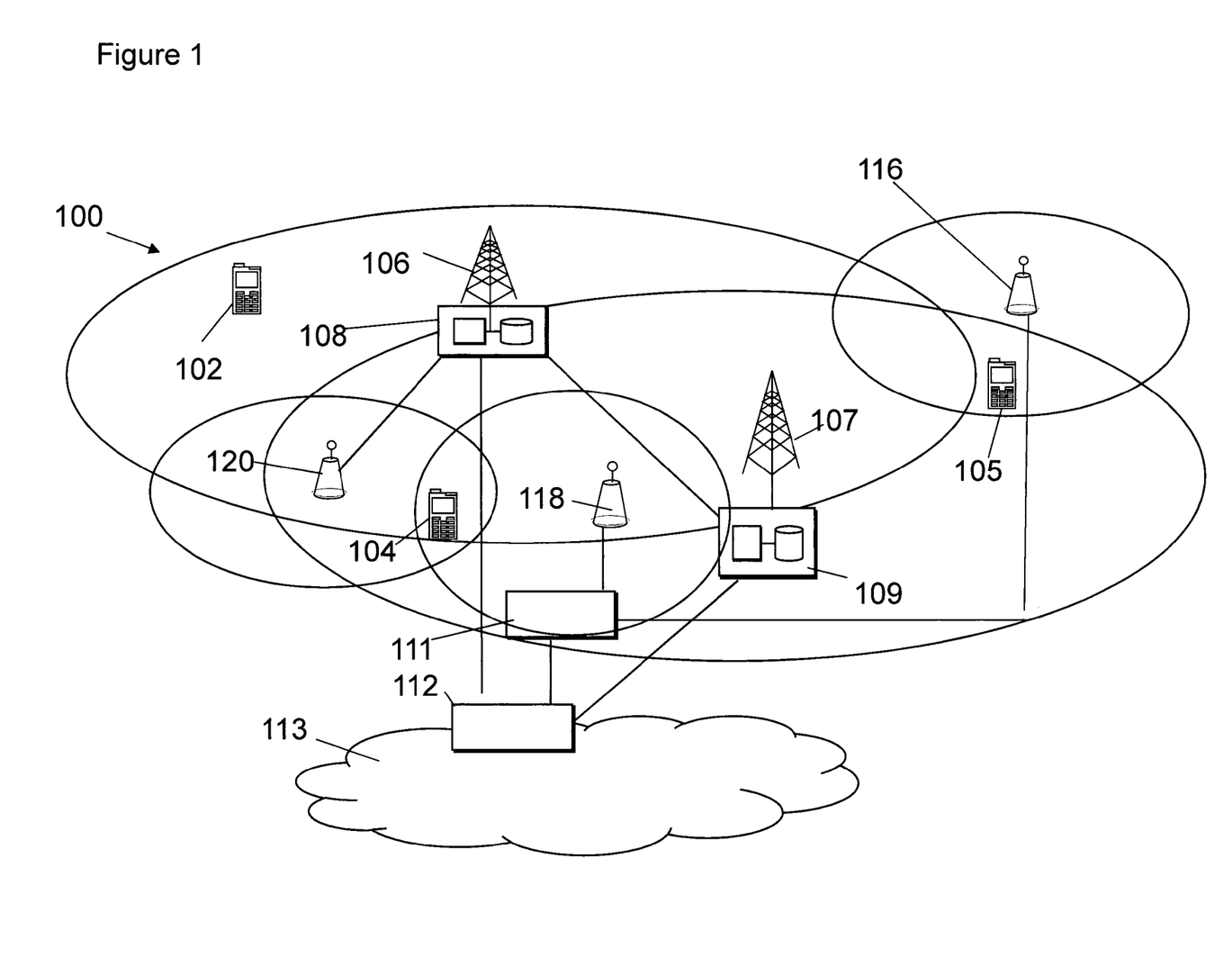
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
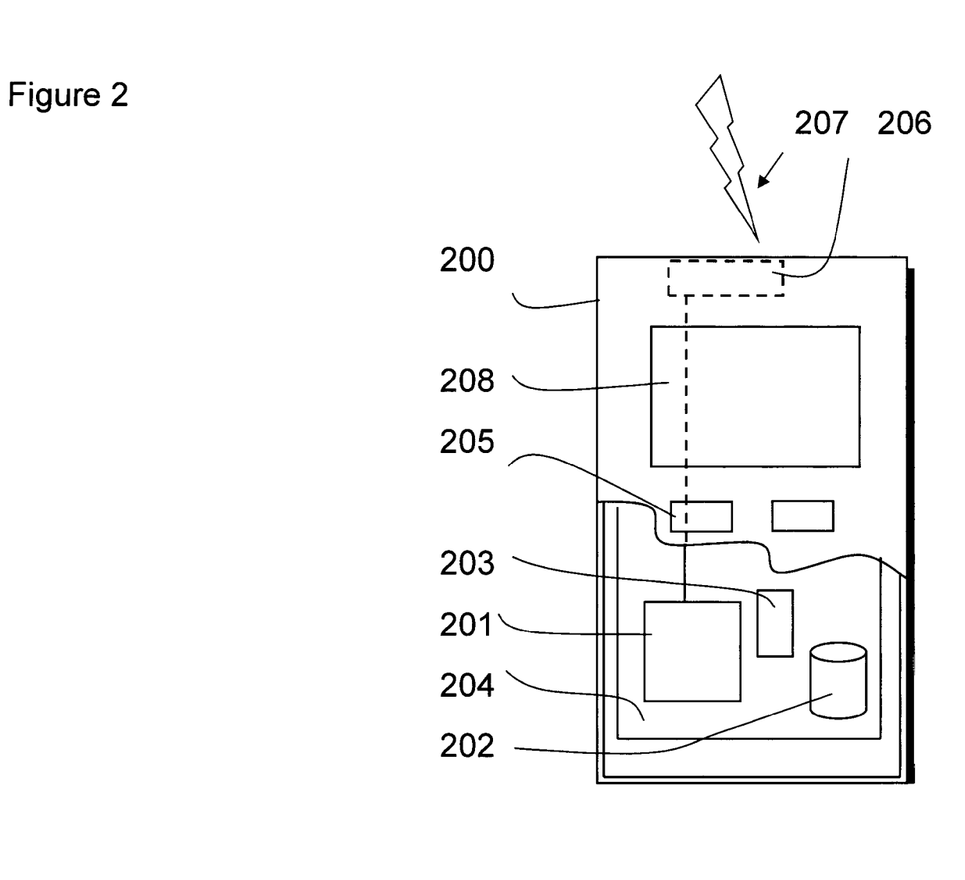
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

An example of a suitable communications system is the 5G or NR concept. Network architecture in NR may be similar to that of LTE-advanced. Base stations of NR systems may be known as evnext generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
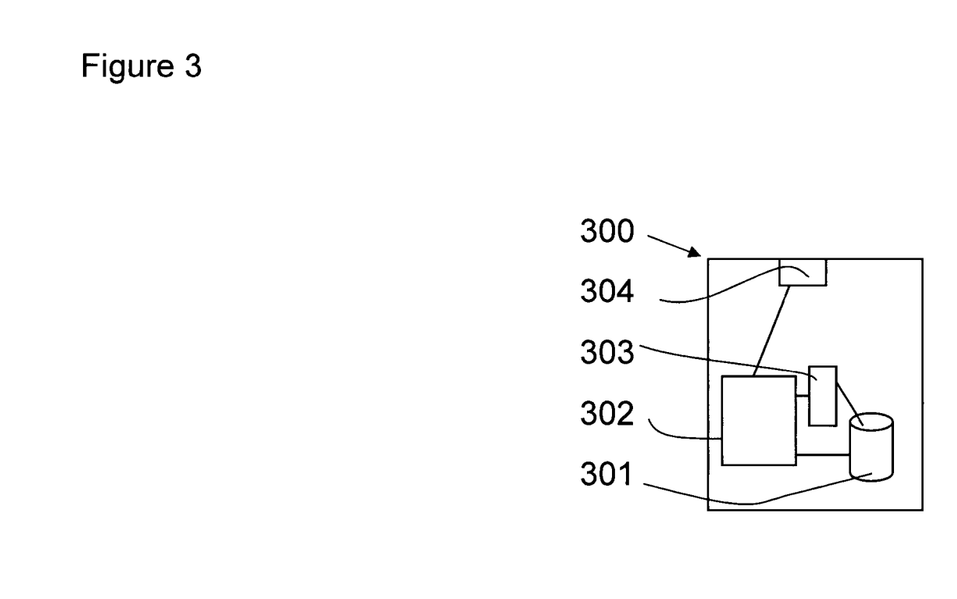
FIG. 3 shows a schematic diagram of an example control apparatus.

FIG. 3 shows an example of a control apparatus for a communication system, for example to be coupled to and/or for controlling a station of an access system, such as a RAN node, e.g. a base station, (e) node B or 5G AP, or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The following is described with reference to dual connectivity (DC). Dual connectivity is a mode of operation of a UE in connected, e.g. RRC_CONNECTED, mode. The UE is configured with a master cell group (MCG) and a secondary cell group (SCG). In DC, a given UE consumes radio resources provided by at least two network points, e.g. Master and Secondary eNBs of the MCG and the SCG, respectively, connected with non-ideal backhaul. Dual connectivity may achieve improved inter-site carrier aggregation performance across cells connected via non-ideal-backhaul.

For LTE-NR interworking, dual connectivity has been agreed for inter-RAT resource aggregation. LTE-NR tight interworking (also referred to as dual connectivity between LTE and NR) is a feature of NR. LTE-NR interworking may provide reliability of the RRC connection (e.g. from LTE macro node(s)) along with increased per user throughput small cell NR node(s). LTE-NR interworking may be referred to as non-standalone interworking. In an example scenario the LTE macro node carries the Control Plane while the NR small cell carries the User Plane.

Figure 4A:
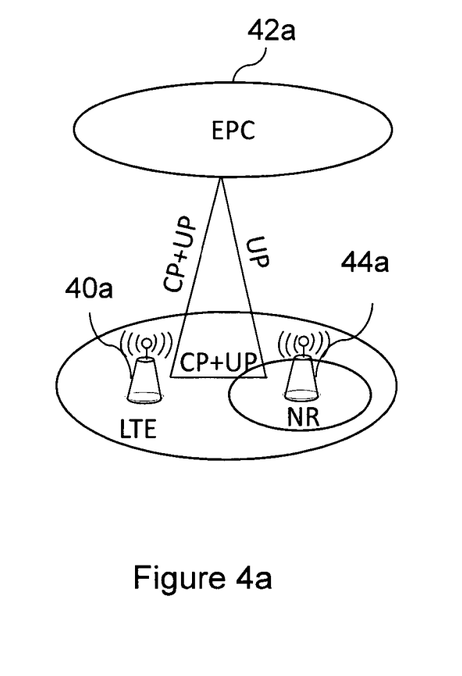
FIG. 4a shows a schematic diagram of an example dual connectivity architecture.
Figure 4B:
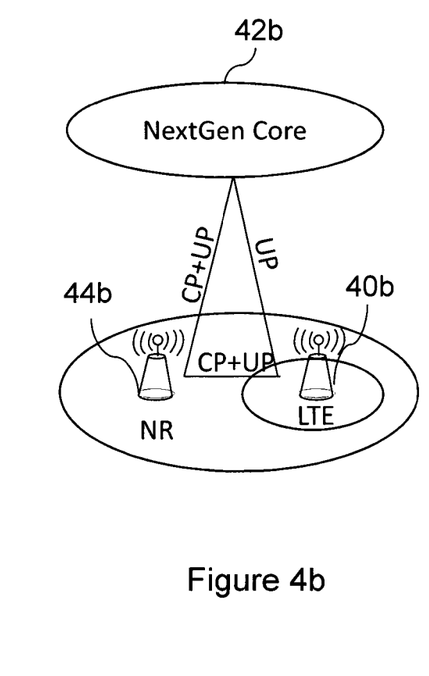
FIG. 4b shows a schematic diagram of an example dual connectivity architecture.
Figure 4C:
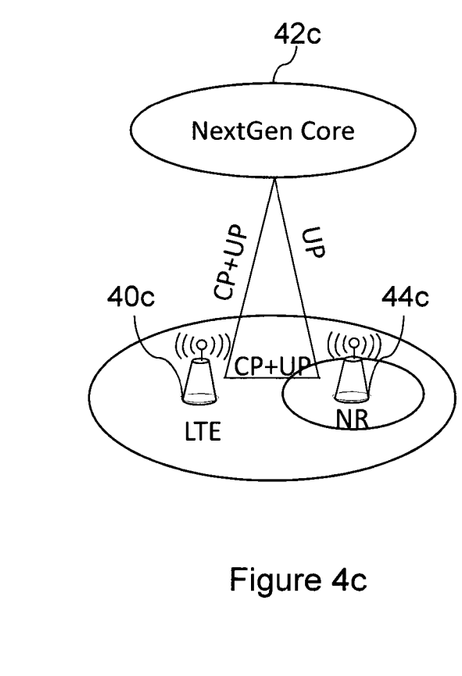
FIG. 4c shows a schematic diagram of an example dual connectivity architecture.

FIGS. 4a, 4b and 4c show three possible LTE-NR tight interworking deployment scenarios. The scenarios shown in FIGS. 4a, 4b and 4c correspond to three non-standalone interworking scenarios which have been considered and may be referred to Options 3, 4 and 7 respectively.

A LTE assisted non-standalone scenario is shown in FIG. 4a. In this scenario, the LTE access point 40a is control plane (CP) connected to the EPC 42a. The NR access point 44a has a user plane (UP) connection to the EPC 42a and is CP and UP connected to the LTE node 40a.

A NR assisted non-standalone scenario is shown in FIG. 4b. In this scenario, the NR access point 44b (or gNB) is control plane connected to a next generation core (NGCN) 42b. The LTE access point 40b is UP connected to the NGCN and UP and CP connected to the NR access point 44b.

A further LTE assisted non-standalone scenario is shown in FIG. 4c. This scenario is similar to that shown in FIG. 4a, but the LTE access point 40c is control plane connected to a NGCN 42c and the NR access point 44c is UP connected to the NGCN 42c.

In NR, a state in which the security context is preserved in a UE and NR gNB without connected mode activities between the UE and NR gNB is possible. In this state a UE is reachable via DRX based paging. This state may be known as RRC_INACTIVE and may improve energy efficiency or usage latency of the NR connection.

It may be desirable to optimize the dual connectivity between LTE and NR so that when the NR radio is not active, i.e. there is no active data transmission and the NR radio is directed to a power efficient state such as RRC_INACTIVE, the UE is not required to perform active measurements (as may be done in a connected state). UE power consumption may thus be reduced. To do so, rapid deactivation and re-activation of LTE-NR dual connectivity usage may be required.

Figure 5:
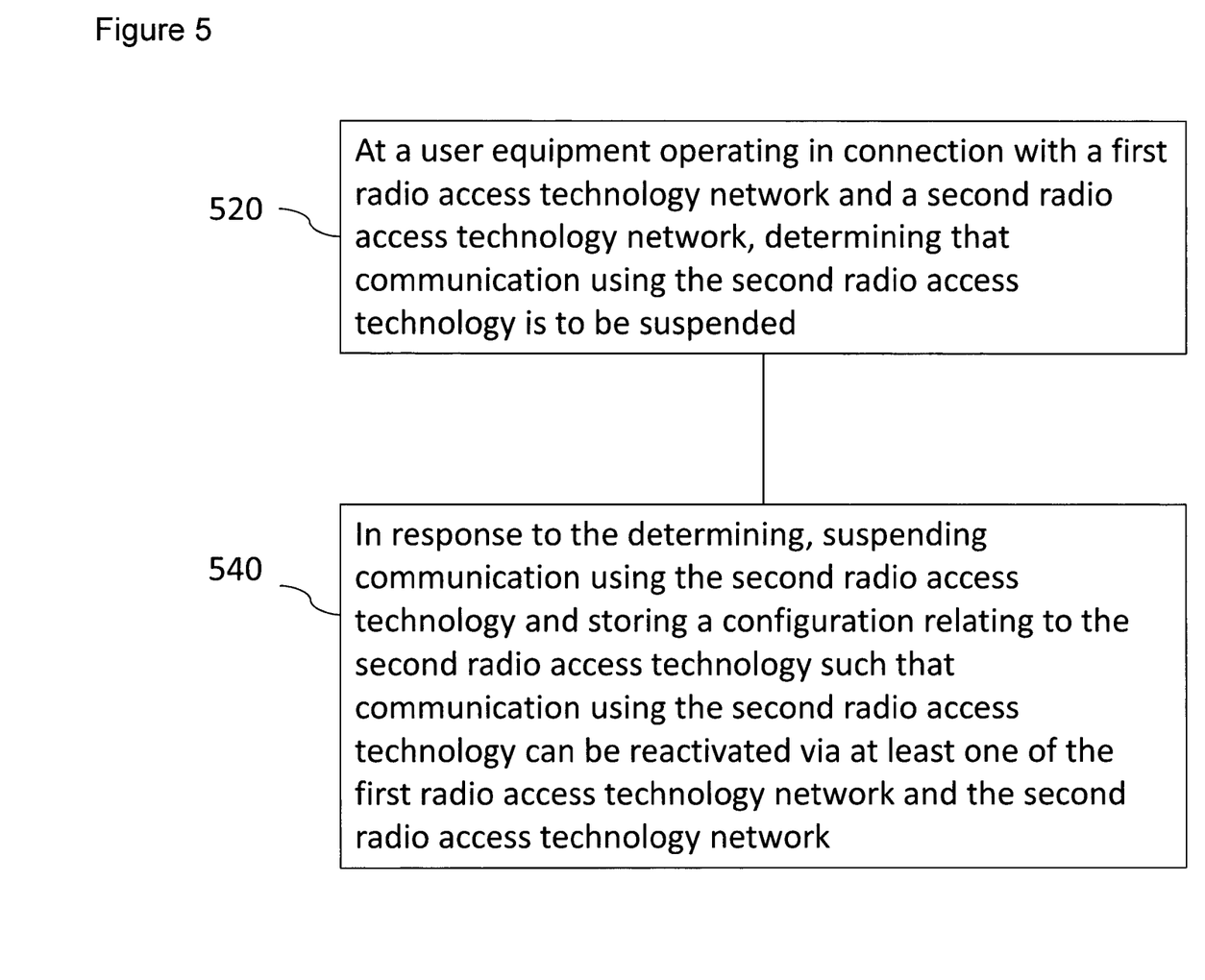
FIG. 5 shows a flowchart of an example method according to embodiments.

FIG. 5 shows a flowchart of a method according to one embodiment. In a first step, 520, the method comprises, at a user equipment operating in connection with a first radio access technology network and a second radio access technology network, determining that communication using the second radio access technology is to be suspended.

In a second step, 540, the method comprises, in response to the determining, suspending communication using the second radio access technology and storing a configuration relating to the second radio access technology such that communication using the second radio access technology can be reactivated via at least one of the first radio access technology network and the second radio access technology network.

Figure 6:
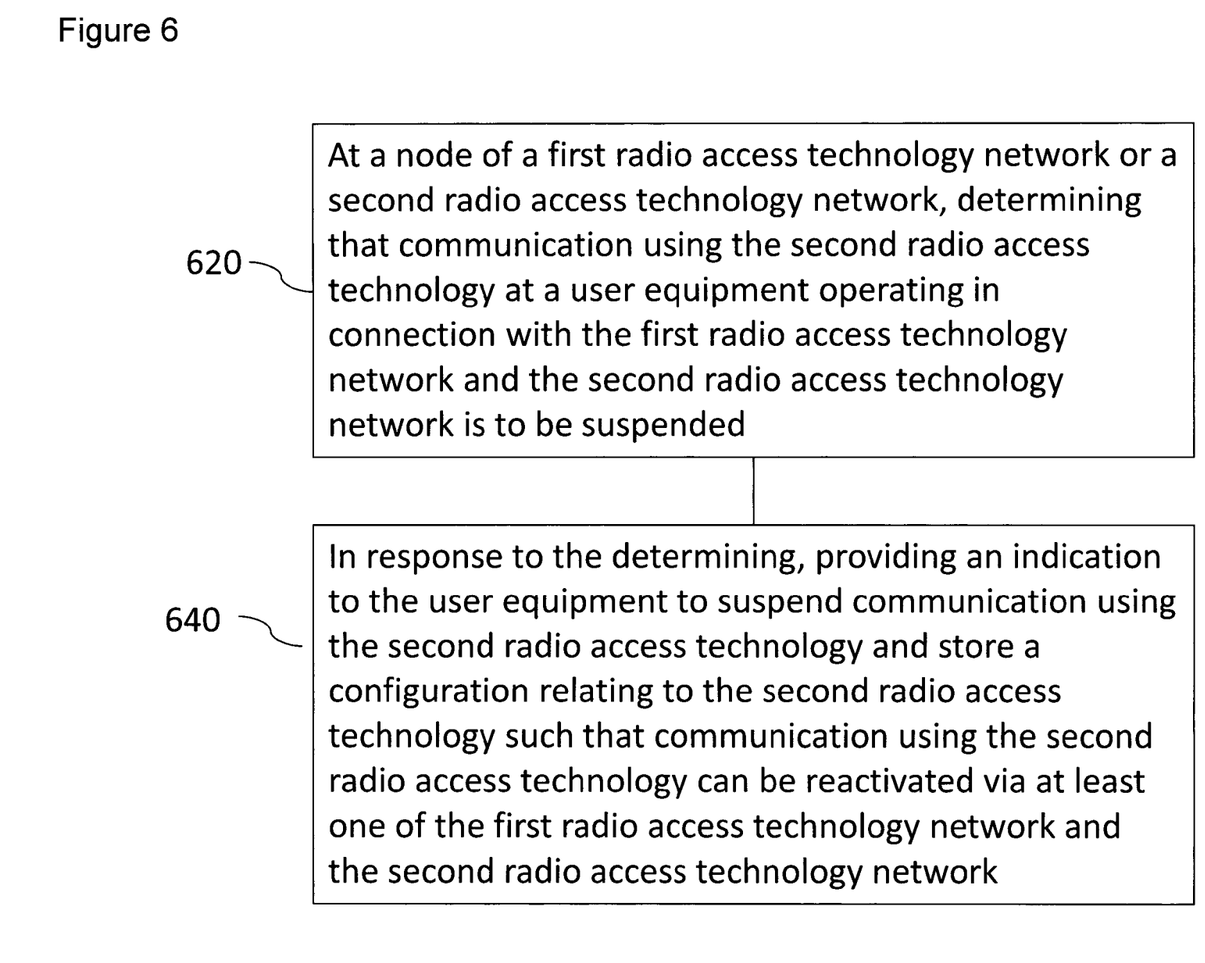
FIG. 6 shows a flowchart of an example method according to embodiments.

FIG. 6 shows a flowchart of a method according to one embodiment. In a first step, 620, the method comprises, at a node of a first radio access technology network or a second radio access technology network, determining that communication using the second radio access technology at a user equipment operating in connection with the first radio access technology network and the second radio access technology network is to be suspended.

In a second step, 640, the method comprises, in response to the determining, providing an indication to the user equipment to suspend communication using the second radio access technology and store a configuration relating to the second radio access technology such that communication using the second radio access technology can be reactivated via at least one of the first radio access technology network and the second radio access technology network. Communication using the second RAT may be reactivated via at least one of a node or access point of the first and second RAT.

The UE may be operating using dual connectivity. The first RAT may comprise LTE and an access point of the first RAT may be an eNB. The first RAT network may include the MCG. Nodes of the MCG may be referred to as master nodes (MN). The second RAT may comprise NR and an access point of the second RAT may be a gNB. The second RAT network may include the SCG. Nodes of the SCG may be referred to as secondary nodes (SN).

The configuration related to the second RAT may be the SCG configuration.

Determining to suspend communication with the second RAT may comprise receiving an indication from an access point of the first RAT network or an access point of the second RAT network to suspend communication using the second RAT and store a configuration relating to the second RAT. That is, the network may determine to suspend communication with the second RAT and provide an indication to the UE. Here and in the following, the term network may refer to the first RAT network (e.g. LTE), the second RAT network (e.g., NR) or a combination of the two (i.e. the two networks working in coordination).

The indication received may comprise a gNB or eNB command. For example, a gNB or eNB may indicate to UE to suspend at least the NR part of the LTE-NR configuration so that UE stores (retains) the configuration but does not use it.

This indication may also include additional information such as, but not limited to, conditions when communication using the second RAT, e.g., SCG operations, are to be reactivated, and/or measurement configuration.

Alternatively, or in addition, the determining may be based on at least one event such as, but not limited to, mobility, measurement, measurement event triggering or UE inactivity. For example, if specific mobility criteria is met such as the SCG becomes bad the command may be implicitly received. Alternatively, or in addition, the command may be implicitly assumed to have been received when another specific command (e.g. inactivation command) is received by NW.

In an example, the network decides to suspend usage of SCG, but also to have the UE retain the SCG configuration. The network provides an indication to the UE. The indication comprises a command to the UE to suspend ongoing SCG operation but retain the configuration.

UE maintains the SCG configuration as directed, and may treat the NR RRC as if it was in the NR RRC_INACTIVE state. The SCG configuration is not released but may be stored inside the UE in the form of a retrievable configuration.

LTE/NR tight interworking uses only one RRC state from the master. It is proposed to reuse the NR RRC_INACTIVE state and retain the SCG configuration as a retrievable configuration in that state. From the LTE perspective, SCG inactivity is a configuration in which the UE performs similar actions as the NR RRC INACTIVE state, but the UE state is still operated according to LTE RRC.

The UE may be re-configured to act according to the rules of the RRC_INACTIVE state in the NR side. The UE in the non-standalone state may perform similar procedures as in the NR stand-alone RRC_INACTIVE state (while the LTE side would be still in RRC_CONNECTED state or in LTE RRC_INACTIVE state or RRC Light-connected state).

Once the SCG is suspended at the UE, the RRC protocol in the UE will remove linking of the NR RRC context from the LTE RRC context and keep the NR RRC protocol running in a "semi-standalone" mode, i.e. treat the NR configuration as if it was a standalone operation. Hence, by the term semi-standalone it may be understood that the NR RRC protocol functions that are executed in the RRC_INACTIVE state in NR are run normally aside the regular LTE RRC functions.

The configuration relating to the second RAT may be changed based on at least one event. The method may comprise receiving information from the network, said information comprising an indication to change how the configuration relating to the second RAT changes based on the at least one event. The at least one event may comprise at least one of mobility, measurement event triggering or UE activity or any other suitable event.

The UE may be configured with rules which are invoked by the UE on certain events, e.g. mobility, and result in the update of the configuration (or refreshing the configuration with new parameters). For example, one of the rules may be to convert a SCG configuration to a MCG one (e.g. if the UE leaves the coverage of the master node).

The network may indicate rules that govern when the UE should change how the SCG configuration may change based on e.g. PCell mobility (e.g. LTE PCell becomes bad enough so that UE should start using NR gNB), measurement event triggering (e.g. neighbour cell becomes better or weaker than threshold) or UE activity (e.g. UE triggers data transmission for a new service). The rules may be included in an indication received from the NW.

SCG mobility continues (in RRC_INACTIVE) with rules defined by the network (with additional guidance e.g. monitor paging etc.). There could be additional rules to remove SCG configuration if the SCG cell/gNB changes or if the UE moves out of the RAN paging area. The network may continue to send updated SCG configuration upon SCG mobility SCG mobility updates to the active or stored SCG configuration may be received via a MN RRC connection.

The method may comprise reactivating communication using the second RAT based on detecting at least one event, e.g., measurement conditions or UL/DL data activity. In an example, the UE may reactivate a stored SCG configuration upon UL/DL data activity on SCG.

Alternatively, or in addition, the method may comprise receiving an indication at the UE from at least one of the first RAT network and the second RAT network to reactivate communication using the second RAT and reactivating communication using the second RAT in response to the received indication.

In an example, the network may activate a stored configuration. For example, the network may ask the UE to enter directly into LTE-NR tight interworking by sending a DL message (e.g. paging or another L2 message), thereby activating a given configuration.

One or more configurations relating to the second RAT may be activated by the UE depending on meeting triggering conditions.

Reactivating communication using the second RAT may comprise the first RAT network performing an SN addition, e.g. an SCG change. Reactivating communication using the second RAT may comprise connecting to the second RAT over second RAT air interface. For example, reactivating communication with the second RAT may comprise a RACH procedure with an access point of the second RAT network.

Upon receiving a command from the network, the tight interworking operation may be resumed by joining the MCG and SCG contexts together as before NR communication was suspended. Paging/Notification monitoring may operate via a coordinated/centralized identifier between the first and/or second RAT network (LTE/NR).

SCG re-activation may be achieved in a fraction of time compared to initial SCG configuration. Re-activation times (the time taken between resumption from a power saving state to $1^{st}$ data transmission) in the order of 10 ms may be achieved (based on NR control plane latency) compared to 100's of ms in LTE RRC reconfiguration.

Figure 7:
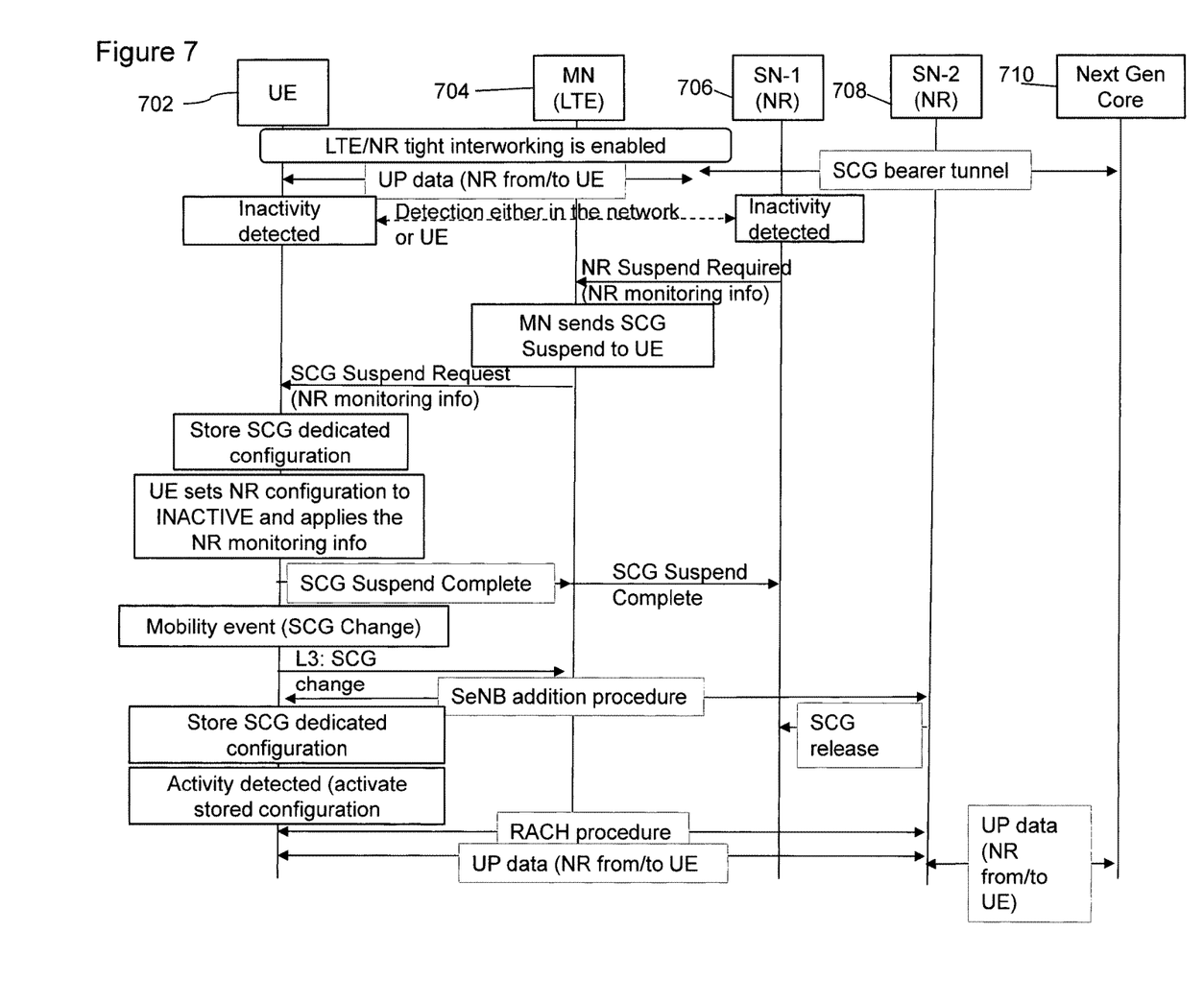
FIG. 7 shows an example signalling diagram for use in an embodiment.

FIG. 7 shows an example signalling diagram for use in one embodiment. In this example, there is a UP data transfer between a UE 702 and a SN-1 706 over a NR interface. SN-1 has an SCG bearer tunnel with the NGCN 710. It is determined for UE 702 operating using LTE/NR tight interworking that SCG operation with SN-1 706 should be suspended due to inactivity between the UE and the SCG. The UE receives a suspend request from the MN 704 which includes NR monitoring information. The UE 702 stores the SCG configuration and sets NR configuration to INACTIVE and applies the NR monitoring information. The UE forwards an indication to the network that the SCG suspend has been completed.

Upon detecting a mobility event, the UE 702 changes SCG and updates the stored SCG configuration. The old SCG is released. When activity is detected, the UE 702 reactivates the SCG configuration and begins a RACH procedure with the new SCG, e.g SN-2 708. Communication with the new SCG, i.e. UP data transfer, is then started.

Although the above is described with reference to the scenario shown in FIG. 4*c* ("Option 7"), the same mechanism can be used for the tight interworking scenarios 3 and 4, shown in FIGS. 4*a* and 4*b*, respectively.

It should be understood that each block of the flowchart of FIGS. 5 and 6 and any combination thereof may be implemented by various means or their combinations, such as hardware, software, firmware, one or more processors and/or circuitry.

The method may be implemented on a mobile device as described with respect to FIG. 2 or control apparatus as shown in FIG. 3.

Control functions may comprise determining that communication using the second radio access technology is to be suspended in response to the determining, suspending communication using the second radio access technology and storing a configuration relating to the second radio access technology such that communication using the second radio access technology can be reactivated via at least one of the first radio access technology network and the second radio access technology network.

Alternatively, or in addition, control functions may comprise determining that communication using the second radio access technology at a user equipment operating in connection with the first radio access technology network and the second radio access technology network is to be suspended and in response to the determining, providing an indication to the user equipment to suspend communication using the second radio access technology and store a configuration relating to the second radio access technology such that communication using the second radio access technology can be reactivated via at least one of the first radio access technology network and the second radio access technology network It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE/LTE-A and NR, similar principles can be applied in relation to other networks and communication systems. For example, the principles may be applies to devices operating using multi-connectivity. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising, at a user equipment operating in connection with a first network configured to operate using a first radio access technology and a second network configured to operate using a second radio access technology:
   determining that communication between the user equipment and the second network using the second radio access technology is to be suspended;
   in response to the determining, suspending communication between the user equipment and the second network using the second radio access technology and storing a configuration relating to the second radio access technology,
   wherein communication between the user equipment and the second network using the second radio access technology can be reactivated via at least one of the first network and the second network using the stored configuration relating to the second radio access technology,
   wherein the user equipment is operating using dual connectivity,
   wherein the user equipment continues communication with the first network using the first radio access technology, and
   wherein the first network comprises master cell groups and the second network comprises secondary cell groups.

2. The method according to claim 1, wherein the determining comprises receiving an indication from the first network or the second network to suspend communication between the user equipment and the second network using the second radio access technology and to store the configuration relating to the second radio access technology.

3. The method according to claim 1, comprising changing the configuration relating to the second radio access technology based on at least one event.

4. The method according to claim 3, comprising receiving information from the first network or the second network, said information comprising an indication to change how the configuration relating to the second radio access technology changes based on the at least one event.

5. The method according to claim 1, comprising:
   reactivating communication between the user equipment and the second network using the second radio access technology based on detecting at least one event.

6. The method according to claim 1, comprising:
   receiving an indication from at least one of the network and the second network to reactivate communication between the user equipment and the second network using the second radio access technology; and
   reactivating communication between the user equipment and the second network using the second radio access technology in response to the received indication.

7. The method according to claim 1, wherein reactivating communication between the user equipment and the second network using the second radio access technology comprises performing a random access procedure with an access point of the second network.

8. The method according to claim 7, comprising:
   providing an indication to the user equipment to reactivate communication between the user equipment and the second network using the second radio access technology.

9. A method comprising, at a node of a first network using a first radio access technology or a second network using a second radio access technology:
   determining that communication using the second radio access technology at a user equipment operating in connection with the first network and the second network is to be suspended; and
   in response to the determining, providing an indication to the user equipment to suspend communication between the user equipment and the second network using the second radio access technology and storing a configuration relating to the second radio access technology,
   wherein communication using the second radio access technology can be reactivated via at least one of the first network and the second network using the stored configuration relating to the second radio access technology,
   wherein the user equipment is operating using dual connectivity,
   wherein the user equipment continues communication with the first network using the first radio access technology, and
   wherein the first comprises master cell groups and the second network comprises secondary cell groups.

10. The method according to claim 9, comprising providing information to the user equipment, said information comprising an indication to change how the configuration relating to the second radio access technology changes based on at least one event.

11. An apparatus comprising:
at least one processor and at least one memory including a computer program code, the at least one memory and the computer program code configured to, with the at least one processor, cause the apparatus at least to:
at a user equipment operating in connection with a first network using a first radio access technology and a second network using a second radio access technology, determine that communication between the user equipment and the second network using the second radio access technology is to be suspended;
in response to the determining, suspend communication between the user equipment and the second network using the second radio access technology and store a configuration relating to the second radio access technology,
wherein communication between the user equipment and the second network using the second radio access technology can be reactivated via at least one of the first network and the second network using the stored configuration relating to the second radio access technology,
wherein the user equipment is configured to operate using dual connectivity,
wherein the user equipment continues communication with the first network using the first radio access technology, and
wherein the first network comprises master cell groups and the second network comprises secondary cell groups.

12. The apparatus according to claim 11, wherein the at least one memory and the computer program code configured to, with the at least one processor, cause the apparatus at least to:
receive an indication from the first network or the second network to suspend communication between the user equipment and the second network using the second radio access technology and to store the configuration relating to the second radio access technology.

13. The apparatus according to claim 11, wherein the at least one memory and the computer program code configured to, with the at least one processor, cause the apparatus at least to:
change the configuration relating to the second radio access technology based on at least one event.

14. The apparatus according to claim 13, wherein the at least one memory and the computer program code configured to, with the at least one processor, cause the apparatus at least to:
receive information from the first network or the second network, said information comprising an indication to change how the configuration relating to the second radio access technology changes based on the at least one event.

15. The apparatus according to claim 11, wherein the at least one memory and the computer program code configured to, with the at least one processor, cause the apparatus at least to:
reactivate communication between the user equipment and the second network using the second radio access technology based on detecting at least one event.

16. The apparatus according to claim 11, wherein the at least one memory and the computer program code configured to, with the at least one processor, cause the apparatus at least to:
receive an indication from at least one of the first network and the second network to reactivate communication between the user equipment and the second network using the second radio access technology; and
reactivate communication between the user equipment and the second network using the second radio access technology in response to the received indication.

17. The apparatus according to claim 11, wherein the communication between the user equipment and the second network using the second radio access technology is reactivated by performing a random access procedure with an access point of the second network.

* * * * *

UNITED STATES PATENT AND TRADEMARK OFFICE
CERTIFICATE OF CORRECTION

Page 1 of 2

PATENT NO. : 11,343,866 B2
APPLICATION NO. : 16/648181
DATED : May 24, 2022
INVENTOR(S) : Ali et al.

It is certified that error appears in the above-identified patent and that said Letters Patent is hereby corrected as shown below:

In the Claims

Column 15, Line 52, Claim 1, delete "determining that communication" and insert therefor -- determining that a communication --.

Column 15, Line 55, Claim 1, delete "suspending communication" and insert therefor -- suspending the communication --.

Column 15, Line 60, Claim 1, delete "wherein communication" and insert therefor -- wherein the communication --.

Column 16, Line 1, Claim 1, delete "equipment continues communication" and insert therefor -- equipment continues a communication --.

Column 16, Line 9, Claim 2, delete "suspend communication" and insert therefor -- suspend the communication --.

Column 16, Line 23, Claim 5, delete "reactivating communication" and insert therefor -- reactivating the communication --.

Column 16, Line 31, Claim 6, delete "reactivating communication" and insert therefor -- reactivating the communication --.

Column 16, Lines 34-35, Claim 7, delete "reactivating communication" and insert therefor -- reactivating the communication --.

Column 16, Lines 40-41, Claim 8, delete "reactivate communication" and insert therefor -- reactivate the communication --.

Signed and Sealed this
Twenty-sixth Day of July, 2022

Katherine Kelly Vidal
*Director of the United States Patent and Trademark Office*

Column 16, Line 47, Claim 9, delete "that communication" and insert therefor -- that a communication --.

Column 16, Line 52, Claim 9, delete "suspend communication" and insert therefor -- suspend the communication --.

Column 16, Line 56, Claim 9, delete "wherein communication" and insert therefor -- wherein the communication --.

Column 16, Line 63, Claim 9, delete "continues communication" and insert therefor -- continues a communication --.

Column 17, Line 14, Claim 11, delete "that communication" and insert therefor -- that the communication --.

Column 17, Line 17, Claim 11, delete "suspend communication" and insert therefor -- suspend the communication --.

Column 17, Line 22, Claim 11, delete "wherein communication" and insert therefor -- wherein the communication --.

Column 17, Line 30, Claim 11, delete "continues communication" and insert therefor -- continues a communication --.

Column 17, Line 41, Claim 12, delete "suspend communication" and insert therefor -- suspend the communication --.

Column 18, Line 23, Claim 15, delete "reactivate communication" and insert therefor -- reactivate the communication --.

Column 18, Line 31, Claim 16, delete "reactivate communication" and insert therefor -- reactivate the communication --.

Column 18, Line 34, Claim 16, delete "reactivate communication" and insert therefor -- reactivate the communication --.